United States Patent
Jung

(10) Patent No.: US 8,846,238 B2
(45) Date of Patent: Sep. 30, 2014

(54) BATTERY MODULE

(75) Inventor: Kang-Sik Jung, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 266 days.

(21) Appl. No.: 12/958,143

(22) Filed: Dec. 1, 2010

(65) Prior Publication Data

US 2012/0045686 A1   Feb. 23, 2012

(30) Foreign Application Priority Data

Aug. 18, 2010 (KR) .................. 10-2010-0079904

(51) Int. Cl.
*H01M 6/42* (2006.01)
*H01M 10/04* (2006.01)
*H01M 2/10* (2006.01)

(52) U.S. Cl.
CPC ........ *H01M 2/1077* (2013.01); *H01M 10/0413* (2013.01); *H01M 10/0468* (2013.01); *Y02E 60/12* (2013.01); *H01M 2/10* (2013.01); *H01M 6/42* (2013.01); *H01M 10/04* (2013.01)
USPC .............. 429/159; 429/96; 429/99; 429/100; 429/163

(58) Field of Classification Search
CPC ........ H01M 2/02; H01M 2/10; H01M 2/1077
USPC ..................... 429/99, 100, 158, 159, 163, 96
See application file for complete search history.

(56) References Cited

U.S. PATENT DOCUMENTS

| | | | |
|---|---|---|---|
| 5,250,371 A * | 10/1993 | Kleinert et al. | 429/99 |
| 2005/0277012 A1 | 12/2005 | Inagaki | |
| 2006/0286441 A1 * | 12/2006 | Matsuoka et al. | 429/99 |
| 2009/0034200 A1 * | 2/2009 | Li et al. | 361/704 |
| 2010/0092861 A1 | 4/2010 | Kim | |
| 2010/0190049 A1 | 7/2010 | Kawase et al. | |

FOREIGN PATENT DOCUMENTS

| | | | |
|---|---|---|---|
| JP | 2008-124033 | | 5/2008 |
| JP | 2008124033 A | * | 5/2008 |
| JP | 2009-004308 | | 1/2009 |
| JP | 2009-081056 | | 4/2009 |
| JP | 2009-099383 | | 5/2009 |
| JP | 2009-135024 | | 6/2009 |
| KR | 10-1999-0050734 | | 7/1999 |
| KR | 10-2010-0041064 A | | 4/2010 |

OTHER PUBLICATIONS

European Search Report dated May 23, 2011, for corresponding European Patent application 11158617.8, noting listed references in this IDS.

(Continued)

*Primary Examiner* — Milton I Cano
*Assistant Examiner* — Jimmy K Vo
(74) *Attorney, Agent, or Firm* — Christie, Parker & Hale, LLP

(57) ABSTRACT

A battery module including a plurality of rechargeable batteries electrically connected to one another; an end plate arranged at an outermost rechargeable battery of the plurality of rechargeable batteries and supporting the plurality of rechargeable batteries; and at least one elastic member at a surface of the end plate facing the outermost rechargeable battery. A pair of elastic members may be arranged symmetrically with respect to a center line in the longitudinal direction.

10 Claims, 7 Drawing Sheets

(56) References Cited

OTHER PUBLICATIONS

Patent Abstracts of Japan, and English machine translation of Japanese Publication 2008-124033, listed above, 21 pages.
Patent Abstracts of Japan, and English machine translation of Japanese Publication 2009-081056, listed above, 17 pages.
Patent Abstracts of Japan, and English machine translation of Japanese Publication 2009-099383, listed above, 15 pages.
Korean Office Action dated Nov. 11, 2011 for corresponding Korean Application No. 10-2010-0079904, listing the reference cited above.
EPO Office action dated Sep. 12, 2013, for corresponding European Patent application 11158617.8, (4 pages).

* cited by examiner

BATTERY MODULE

CROSS-REFERENCE TO RELATED APPLICATION

This application claims priority to and the benefit of Korean Patent Application No. 10-2010-0079904 filed in the Korean Intellectual Property Office on Aug. 18, 2010, the entire content of which is incorporated herein by reference.

BACKGROUND

1. Field

Aspects of embodiments of the present invention relate to a battery module and, more particularly, to a battery module capable of stably fixing rechargeable batteries.

2. Description of the Related Art

Unlike a primary battery that is incapable of being recharged, a rechargeable battery may be repeatedly charged and discharged. Small-capacity rechargeable batteries are used for small portable electronic devices such as mobile phones, laptop computers, and camcorders, while large-capacity batteries are widely used as power sources for driving motors of hybrid vehicles, etc.

Recently, high-power battery modules using a high energy density non-aqueous electrolyte have been developed. A battery module is generally composed of a plurality of rechargeable batteries connected in series, in which each rechargeable battery may be formed in a cylindrical shape or a polygonal shape.

Polygonal rechargeable batteries typically include a case, an electrode assembly in which an anode and a cathode are disposed with a separator therebetween, a space in the case where the electrode assembly is disposed, a cap plate sealing the case and having a terminal hole where an electrode terminal is inserted, and an electrode terminal that is electrically connected with the electrode assembly and that protrudes outside the case through the terminal hole.

Typically, the rechargeable batteries are arranged inside the case of the battery module and are fixed by an end plate. However, the arranged rechargeable batteries may be released from the battery module by an external impact, or the connection between the terminals may become loose such that contact is deteriorated.

Also, when combining the end plate to the case by using a screw or a bolt, the screw is typically inserted in a hole formed in the case and the end plate and rotated, such that the combination thereof is time consuming.

If the combination is made using the screw or the bolt, a margin between the size of the screw and the size of the hole formed in the case and the end plate must be minimized.

Further, when the end plate is made of a plastic material, the screw typically must be made of a metal material to eliminate abrasion of the screw to the end plate.

Also, due to the space between the cover inserted with the case and the head of the screw, external vibration is transmitted to the case such that the screw may be released from the case.

The above information disclosed in this Background section is only for enhancement of understanding of the background of the described technology and therefore it may contain information that does not form the prior art that is already known in this country to a person of ordinary skill in the art.

SUMMARY

Therefore, according to an aspect of embodiments of the present invention, a battery module has an improved structure that is capable of stably fixing rechargeable batteries by providing an elastic structure member that is capable of firmly supporting the rechargeable batteries to the end plate.

According to an embodiment of the present invention, a battery module includes a plurality of rechargeable batteries electrically connected to one another; an end plate arranged at an outermost rechargeable battery of the plurality of rechargeable batteries and supporting the plurality of rechargeable batteries; and at least one elastic member at a surface of the end plate facing the outermost rechargeable battery.

The at least one elastic member may include a pair of elastic members arranged symmetrically. The pair of elastic members may be arranged symmetrically right and left with respect to a center line extending in a longitudinal direction (a y-axis direction) and dividing the end plate into right and left portions, or the pair of elastic members may be arranged symmetrically upward and downward with respect to a center line extending in a transverse direction (a z-axis direction) and dividing the end plate into upper and lower portions.

The surface of the end plate facing the outermost rechargeable battery may have at least one groove receiving the at least one elastic member, and the at least one elastic member may include a flat spring.

A battery module according to an exemplary embodiment may further include a case receiving the plurality of rechargeable batteries, the case may include a pair of outer walls facing each other, and the end plate may be coupled to the pair of outer walls. The ends of the outer walls of the case may have at least one through-hole, a side of the end plate may have at least one coupling groove corresponding to the at least one through-hole, and the side of the end plate may include at least one fastening member inserted into the at least one through-hole and the at least one coupling groove and coupling the case and the end plate to each other.

In one embodiment, the at least one coupling groove does not include an interior thread, the at least one fastening member does not include a screw thread, and the at least one fastening member is made of a plastic material.

The fastening member may include a body inserted in the coupling groove and a head held close to the outside of the case.

The battery module may further include a cover coupled to an exterior of the case.

A battery module may further include another end plate arranged at another outermost rechargeable battery of the plurality of rechargeable batteries located at an end of the battery module opposite the outermost rechargeable battery, the another end plate supporting the plurality of rechargeable batteries, and at least one another elastic member at a surface of the another end plate facing the another outermost rechargeable battery. In one embodiment, each of the at least one elastic member and the at least one another elastic member includes a pair of elastic members arranged symmetrically with respect to a center line extending in a longitudinal direction and dividing the respective end plate into right and left portions. In one embodiment, the at least one elastic member includes a pair of elastic members arranged symmetrically with respect to a center line extending in a longitudinal direction and dividing the end plate into right and left portions, and the at least one another elastic member includes a pair of elastic members arranged symmetrically with respect to a center line extending in a transverse direction and dividing the another end plate into upper and lower portions.

According to aspects of embodiments of the present invention, the rechargeable batteries are stably fixed, the coupling force between the case and the end plate is improved, and the coupling structure of the case and the end plate is simplified, thereby simplifying the assembly process of the battery module.

BRIEF DESCRIPTION OF THE DRAWINGS

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

DESCRIPTION OF REFERENCE NUMERALS INDICATING SOME ELEMENTS IN THE DRAWINGS

Figure 1:
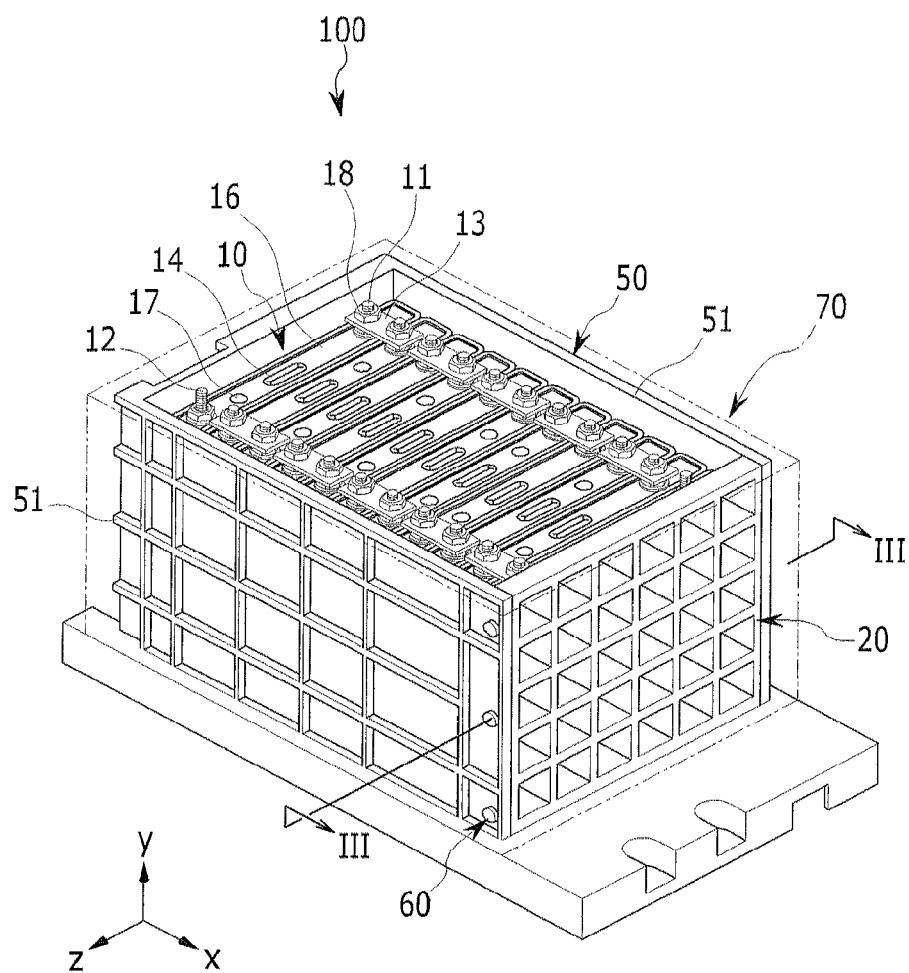
FIG. 1 is a perspective view of a battery module according to an exemplary embodiment of the present invention.

| | |
|---|---|
| 100, 101, 102: battery module | 10: rechargeable battery |
| 20, 30: end plate | 40, 40': elastic member |
| 50: case | 60: fastening member |
| 70: cover | |

DETAILED DESCRIPTION

Some exemplary embodiments of the present invention will be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention. Like reference numerals designate like elements throughout the specification and drawings.

Figure 2:
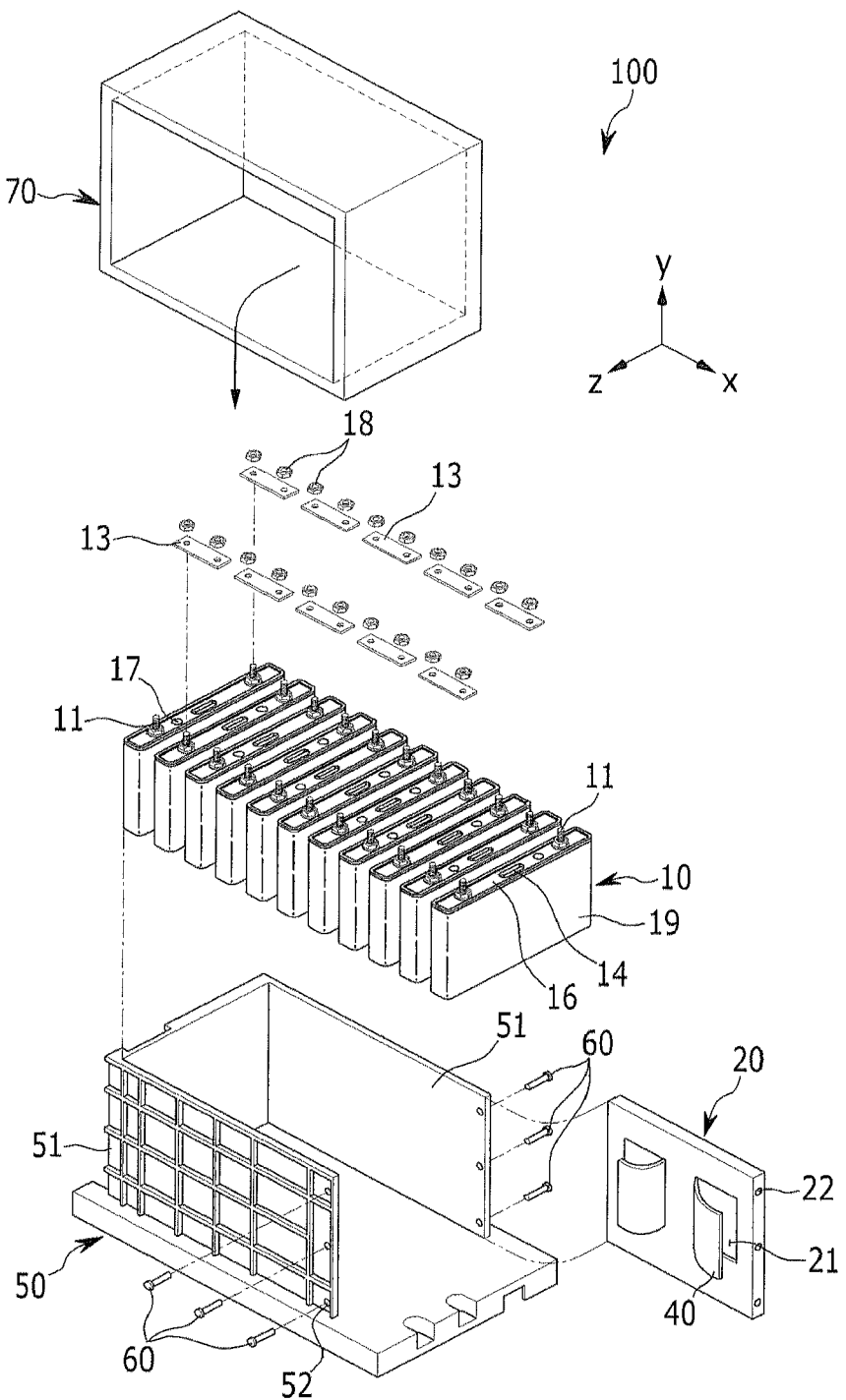
FIG. 2 is an exploded perspective view of the battery module shown in FIG. 1.

FIG. 1 is a perspective view of a battery module according to an exemplary embodiment of the present invention, and FIG. 2 is an exploded perspective view of the battery module shown in FIG. 1.

Referring to FIGS. 1 and 2, a battery module 100 according to an exemplary embodiment of the present invention includes a plurality of rechargeable batteries 10 having a positive terminal 11 and a negative terminal 12, an end plate 20 disposed at the outermost one of the rechargeable batteries 10 and supporting the rechargeable batteries 10, and a case 50 receiving the rechargeable batteries 10 and the end plate 20.

The battery module 100 according to an exemplary embodiment couples the rechargeable batteries 10 in series. However, the present invention is not limited thereto, and the rechargeable batteries 10 may be connected in parallel, or in a combination of in parallel and in series.

According to one embodiment, a case 19 of each of the rechargeable batteries 10 is formed in a polygonal shape, a cap plate 16 covers an opening of one side of the case 19, and the positive terminal 11 and the negative terminal 12 protrude through the cap plate 16. The positive terminal 11 and the negative terminal 12 are electrically connected to positive and negative electrodes, respectively, of an electrode assembly (not shown) housed in the case 19. The cap plate 16 may include a vent member 14 that is opened when an internal pressure of the rechargeable battery 10 is increased, and a sealing cap 17 sealing an electrolyte injection opening.

The rechargeable batteries 10 that are arranged in parallel (i.e. having lateral faces arranged parallel to one another) are connected to each other by a connection member 13. Here, in the state in which the positive terminals 11 and the negative terminals 12 of neighboring rechargeable batteries 10 are alternately disposed, each of the connection members 13 may be connected to the positive terminal 11 of one of the rechargeable batteries 10, and the negative terminal 12 of a neighboring rechargeable battery 10, such as connecting by using a nut 18.

Referring to FIG. 1 and FIG. 2, the case 50 includes a pair of outer walls 51. In the exemplary embodiment shown in FIGS. 1 and 2, an upper portion and one end between the pair of outer walls 51 of the case 50 are open.

The end plate 20 is positioned to face the outermost one of the rechargeable batteries 10 that are arranged in parallel, at one open side of the case 50, thereby supporting the rechargeable batteries 10. Accordingly, the rechargeable batteries 10 that are arranged in parallel are stably supported by the end plate 20 and, as a result, releasing of the rechargeable batteries 10 from the battery arrangement by an external impact or loosening of the connection between the terminals is prevented or substantially prevented.

Referring to FIG. 2, the end plate 20 according to an exemplary embodiment includes an elastic member 40 on a surface of the end plate 20 facing the outside of the outermost rechargeable battery 10. The elastic member 40 provides an elastic force to the rechargeable batteries 10 such that the rechargeable batteries 10 received inside the case 50 may be further securely and stably fixed.

Further, as shown in FIG. 2, the end plate 20 is combined to an end of the outer wall 51 of the case 50. Here, a repulsive force influencing the end plate 20 in the x-axis direction in the case 50 is generated by the elastic force of the elastic member 40 and influences the rechargeable batteries 10. Accordingly, when combining the end plate 20 and the outer wall 51, when a coupling means is inserted in the z-axis direction perpendicular to the direction in which the repulsive force acts, the rechargeable batteries 10 may be stably fixed by the friction force between the end plate 20 and the coupling means generated by the repulsive force.

Figure 3:
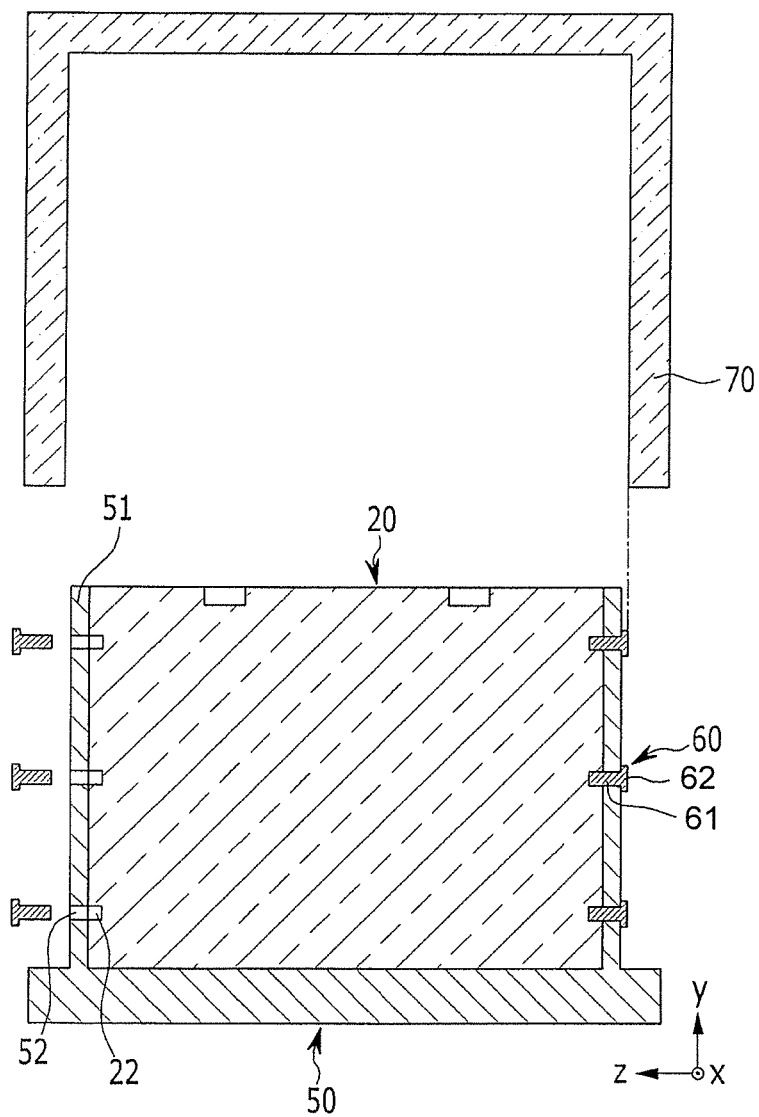
FIG. 3 is a cross-sectional view of the battery module of FIG. 1 taken along line III-III.

FIG. 3 is a cross-sectional view of the battery module 100 taken along line III-III of FIG. 1.

Referring to FIG. 3, at least one through-hole 52 is formed at an end of a pair of outer walls 51 of the case 50 corresponding to the end at which the end plate 20 is arranged. Also, at least one coupling groove 22 is formed at both sides of the end plate 20 in a direction corresponding to the through-holes 52. A fastening member 60 is inserted into the through-hole 52 and the coupling groove 22 such that the end plate 20 is coupled to the outer walls 51 of the case 50.

Referring to FIG. 2, a repulsive force applied to the rechargeable batteries 10 is provided in the x-axis direction inside the case 50 by the elastic force of the elastic member 40. The fastening member 60 is combined perpendicular to the repulsive force generated by the rechargeable batteries 10 such that the friction force is generated between the end plate 20 and the fastening member 60.

Accordingly, even when an internal thread is not formed on an inner surface of the through-hole 52 and the coupling groove 22, and a screw thread is not formed on the fastening member 60, the end plate 20 and the case 50 may be coupled together due to the friction force.

That is, in one embodiment, the fastening member 60 is inserted into the through-hole 52 and the coupling groove 22 through a simple insertion method, rather than a method of coupling with a screw (i.e. through rotation), the coupling process of the battery module 100 may be simplified, and when coupling the fastening member 60, the through-hole 52, and the coupling groove 22, the degree of freedom of the design to provide a coupling margin for a reaction against an external impact may be increased.

The fastening member 60, in one embodiment, includes a body 61 inserted in the coupling groove 22 and a head 62 fixed closely to the outside of the case 50 due to the friction force. The body 61, in one embodiment, does not have a screw thread.

Also, when the end plate 20 is made of a plastic material, and the fastening member 60 is inserted through a simple insertion method, the fastening member 60 is not considered regarding abrasion that is generated where an internal thread is present, and, as a result, the fastening member 60 may be made of a plastic material in one embodiment.

Again referring to FIG. 2, the battery module 100 according to an exemplary embodiment of the present invention further includes a cover 70 coupled to the exterior of the case 50.

The case 50 coupled with the rechargeable batteries 10 is inserted into the cover 70. Since the screw thread is not formed on the body 61 of the fastening member 60 and the fastening member 60 is inserted into the through-hole 52 and the coupling groove 22, if an external impact is applied to the battery module 100, the fastening member 60 may be released outside of the case 50.

Accordingly, in one embodiment, the head 62 of the fastening member 60 is thin such that the case 50 and the cover 70 are very close to each other, and the fastening member 60 is prevented or substantially prevented from being released from the case 50 by the impact.

Figure 4:
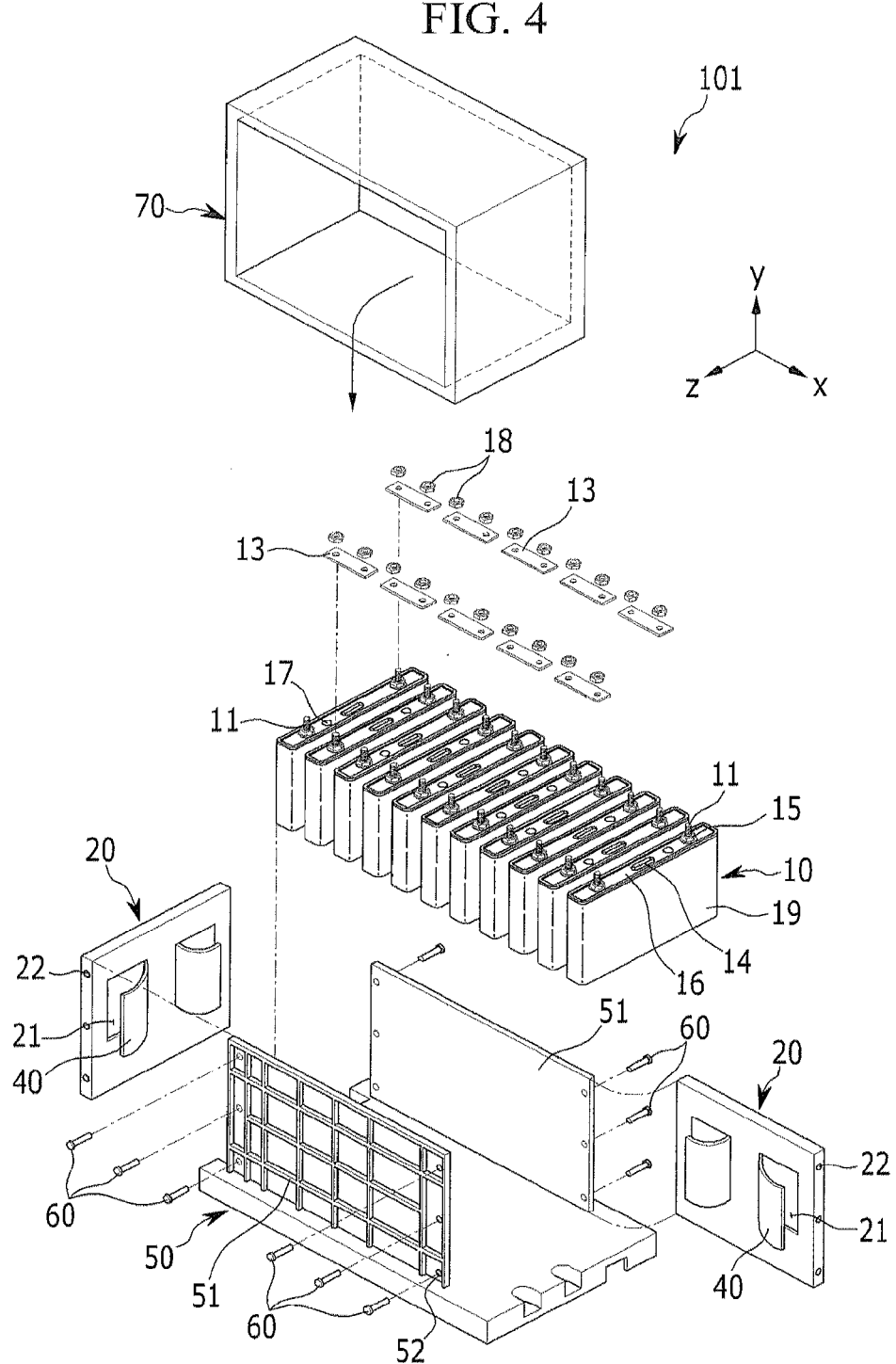
FIG. 4 is an exploded perspective view of a battery module according to another exemplary embodiment of the present invention.

FIG. 4 is an exploded perspective view of a battery module according to another exemplary embodiment of the present invention.

Referring to FIG. 4, a battery module 101 according to another exemplary embodiment, except for a portion of the configuration, has a same structure as the battery module 100 described above and shown in FIGS. 1 and 2. As such, description of the same components and configurations is omitted.

The case 50 of the battery module 101 has an open upper portion between a pair of outer walls 51 and two open end portions.

As shown in FIG. 4, end plates 20 are positioned to be opposite to, or at opposite outer surfaces of, outermost rechargeable batteries 10 positioned at both ends of the plurality of rechargeable batteries 10 arranged in parallel to the case 50 to support the rechargeable batteries 10. In each end plate 20 according to an exemplary embodiment of the present invention, the elastic members 40 are respectively formed at the surfaces facing the outermost rechargeable batteries 10 that are positioned at both ends of the plurality of rechargeable batteries 10. Here, due to the elastic force of each of the elastic members 40 on the rechargeable batteries 10, the repulsive force effected in the x-axis direction inside the case 50 is generated to the end plates 20 that are positioned at both sides of the case 50. Accordingly, when combining the end plates 20 and the outer wall 51, if the coupling means is inserted in the z-axis direction perpendicular to the direction in which the repulsive force acts, the rechargeable batteries 10 may be stably maintained through the friction force of the coupling means and the end plates 20 generated by the repulsive force.

Figure 5A:
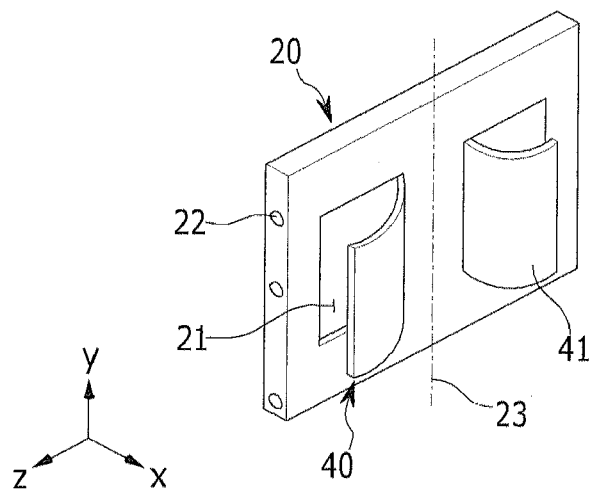
FIGS. 5A and 5B are perspective views of an end plate of a battery module according to an exemplary embodiment of the present invention.
Figure 5B:
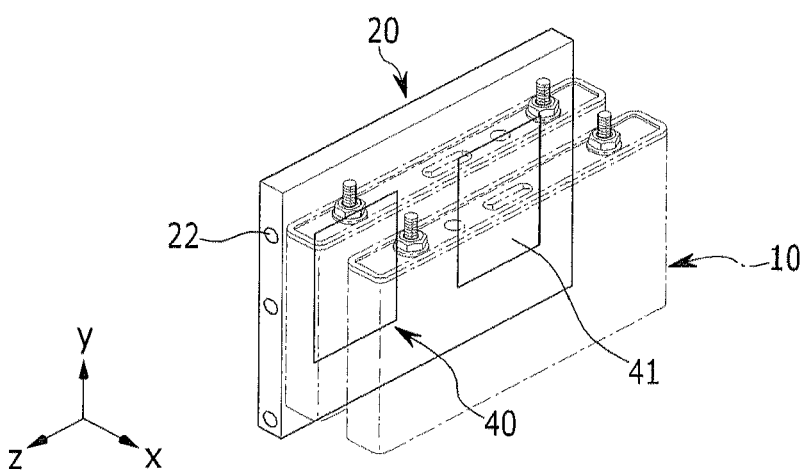

FIGS. 5A and 5B are perspective views of an end plate of a battery module according to an exemplary embodiment of the present invention, the end plate including an elastic member.

Referring to FIGS. 5A and 5B, in one embodiment, the elastic member 40 is arranged symmetrically to the right and left with respect to a longitudinal (i.e. the y-axis direction) center line 23 dividing a surface of the end plate 20 into right and left portions. Also, in one embodiment, the end plate 20 is formed with a pair of grooves 21 that are disposed symmetrically to each other to the right and left of the longitudinal (i.e. the y-axis direction) center line 23.

Referring to FIG. 5A, in one embodiment, one end of the elastic member 40 is coupled to one end of the groove 21 to be capable of being rotated (e.g., as a hinge), and the other end of the elastic member 40 is disposed to be released outside the groove 21. However, alternatively, the elastic member 40 may be fixed through a simple insertion method by forming a coupling groove at the groove 21.

Accordingly, as shown in FIG. 5B, when the end plate 20 is coupled to both ends of the pair of outer walls 51 of the case 50 to be opposed to the rechargeable batteries 10, the other end of the elastic member 40 is pushed inside the groove 21 to be received therein.

Accordingly, when the end plate 20 is coupled to the outer wall 51 of the case 50 and contacts the rechargeable batteries 10 that are received in the case 50, as shown in FIG. 5B, the elastic member 40 is received at the other end of the groove 21 such that the elastic force is effected to the rechargeable batteries 10 facing the elastic member 40. As described above, the elastic force effected to the rechargeable batteries 10 functions as the right and left repulsive forces with respect to the central line 23 of the longitudinal direction (i.e. the y-axis direction) of the end plate 20 coupled to the end of the case 50.

In one embodiment, the elastic member 40 may be a flat spring 41. However, embodiments of the elastic member 40 are not limited to the flat spring 41, and the elastic member 40 according to other embodiments of the present invention may include any suitable elastic member for generating the elastic force. A central portion of the elastic member 40 facing the groove 21 may be convex (i.e. curved in a direction away from the groove 21), as shown in FIGS. 5A and 5B. However, in another embodiment, a central portion of the elastic member 40 facing the groove 21 may be concave. Also, the elastic member 40 according to an exemplary embodiment has a structure in which a pair of flat springs are symmetrically disposed. However, in other embodiments, one or three or more elastic members may be appropriately disposed.

Figure 6A:
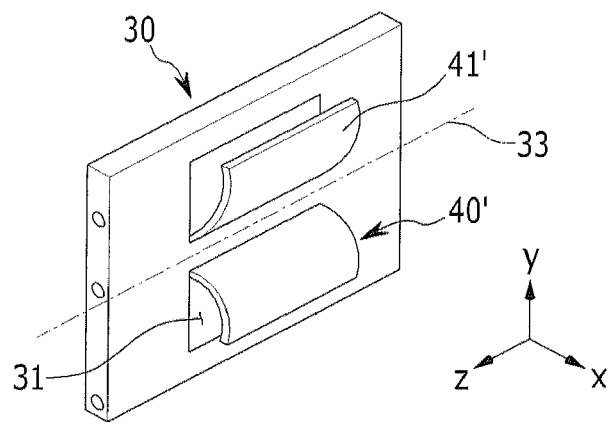
FIGS. 6A and 6B are perspective views of an end plate of a battery module according to another exemplary embodiment of the present invention.
Figure 6B:
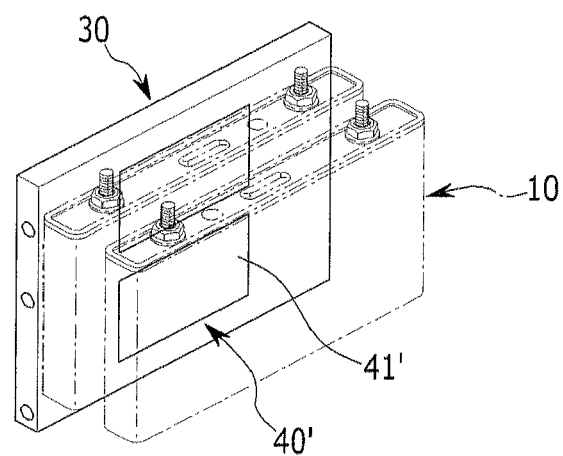

FIGS. 6A and 6B are perspective views of an end plate of a battery module according to another exemplary embodiment of the present invention, the end plate including an elastic member.

Referring to FIGS. 6A and 6B, an end plate 30 of a battery module according to an exemplary embodiment of the present invention, except for the formation position of a groove 31 receiving an elastic member 40' formed at the end plate 30, is similar to the end plate 20 described above and shown in FIGS. 5A and 5B, and, therefore, description of the same components or structures is omitted.

The elastic member 40', in one embodiment, is arranged symmetrically with respect to a center line 33 of the transverse direction (i.e. the z-axis direction) dividing the end plate 30 into upper and lower portions.

Also, in one embodiment, the end plate 30 is formed with a pair of grooves 31 that are disposed symmetrically with respect to the center line 33 of the transverse direction (i.e. the z-axis direction).

Referring to FIG. 6A, in one embodiment, one end of the elastic member 40' is coupled to one end of the groove 31 formed at the end plate 30 to be rotatable, such as by a hinge, and the other end of the elastic member 40' is positioned to be released outside the groove 31. However, in another embodiment, the elastic member 40' may be fixed through a simple insertion method by forming a coupling groove at the groove 31.

Accordingly, in one embodiment, as shown in FIG. 6B, when the end plate 30 is coupled to both ends of the pair of outer walls 51 of the case 50 to be opposed to the rechargeable batteries 10, the other end of the elastic member 40' is pushed inside the groove 31 to be received therein.

Accordingly, when the end plate 30 is coupled to the outer wall 51 of the case 50 and contacts the rechargeable batteries 10 that are received in the case 50, as shown in FIG. 6B, the elastic member 40' is received at the other end of the groove 31 such that the elastic force is applied to the rechargeable batteries 10 facing the elastic member 40'. The elastic force provided to the rechargeable batteries 10 functions as an up and down repulsive force with respect to the central line 33 of the transverse direction (i.e. the z-axis direction) of the end plate 30 coupled to the end of the case 50.

In one embodiment, the elastic member 40' is a flat spring 41'. However, embodiments of the elastic member 40' are not limited to the flat spring 41' and, in other embodiments of the present invention, the elastic member 40' may include any other suitable elastic member for generating the elastic force. In one embodiment, a central portion of the elastic member 40' facing the groove 31 is convex (i.e. curved in a direction away from the groove 31), as shown in FIGS. 6A and 6B. However, in another embodiment, a central portion of the elastic member 40' facing the groove 31 may be concave. Also, in one embodiment, the elastic member 40' has a structure in which the pair of flat springs are disposed in symmetry. However, in other embodiments, one or three or more elastic members may be appropriately disposed.

In one embodiment, the end plate 30 shown in FIG. 6A is coupled to both ends of the pair of outer walls 51 to be opposed to the outermost rechargeable batteries 10 similar to the end plate 20 described above and shown in FIGS. 5A and 5B.

Figure 7:
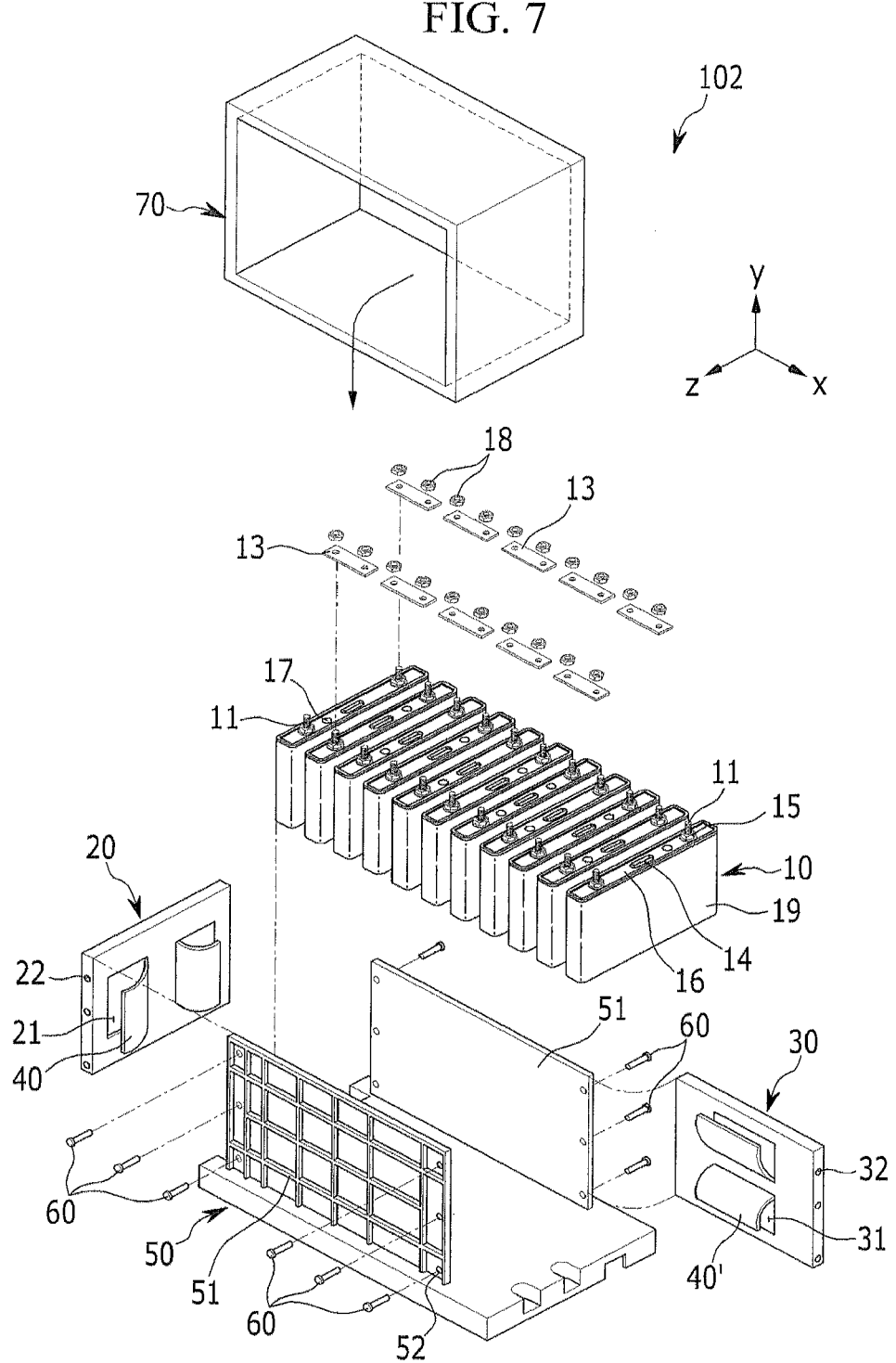
FIG. 7 is an exploded perspective view of a battery module according to another exemplary embodiment of the present invention.

FIG. 7 is an exploded perspective view of a battery module according to another exemplary embodiment of the present invention.

Referring to FIG. 7, a battery module 102 according to another exemplary embodiment of the present invention, except for both ends of a pair of outer walls 51 facing each other and respectively coupled to the end plates 20 and 30, has the same structure as the battery module 101 described above and shown in FIG. 4, and, therefore, description of the same components and structures is omitted.

As shown in FIG. 7, as in FIG. 5A, one end of the outer wall 51 of the case 50 is coupled to the end plate 20 such that the elastic member 40 is disposed right and left with respect to the center line 23 of the longitudinal direction (i.e. the y-axis direction). Also, as in FIG. 6A, the end plate 30 in which the elastic member 40' is disposed upward and downward with respect to the center line 33 of the transverse direction (i.e. the z-axis direction) is coupled to the other end of the outer wall 51 of the case 50.

That is, the end plate 20 is disposed at one end of the case 50 such that the repulsive force may be applied in the right and left directions of the end plate 20. Also, the end plate 30 is disposed at the other end of the case 50 such that the repulsive force may be applied in the upward and downward directions of the end plate 30. Accordingly, the repulsive force is applied in the upward and downward, and right and left directions of the end plates 20 and 30 that are respectively positioned at opposite open ends of the case 50 such that the rechargeable batteries 10 may be further stably fixed to the case 50.

While this invention has been described in connection with some exemplary embodiments, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module comprising:
a plurality of rechargeable batteries electrically connected to one another;
an end plate arranged at an outermost rechargeable battery of the plurality of rechargeable batteries and supporting the plurality of rechargeable batteries, a side of the end plate having at least one coupling groove;
at least one elastic member at a surface of the end plate facing the outermost rechargeable battery;
a case receiving the plurality of rechargeable batteries, the case including a pair of outer walls facing each other, respective ends of the outer walls having at least one through-hole, the at least one coupling groove of the end plate corresponding to the at least one through-hole; and
at least one fastening member inserted into the at least one through-hole and the at least one coupling groove and coupling the pair of outer walls and the end plate to each other, the at least one fastening member being inserted into the at least one through-hole and the at least one coupling groove in a first direction substantially parallel to the surface of the end plate facing the outermost rechargeable battery,
wherein the at least one coupling groove does not include an internal thread, and the at least one fastening member does not include a screw thread,
wherein a repulsive force of the at least one elastic member acting in a second direction substantially perpendicular to the surface of the end plate facing the outermost rechargeable battery generates a friction force between the end plate and the at least one fastening member,
wherein the surface of the end plate facing the outermost rechargeable battery has at least one groove receiving the at least one elastic member, and wherein one end of the elastic member is coupled to one end of the groove to be capable of being rotated.

2. The battery module of claim 1, wherein the at least one elastic member comprises a pair of elastic members arranged symmetrically.

3. The battery module of claim 2, wherein the pair of elastic members are arranged symmetrically with respect to a center line extending in a longitudinal direction and dividing the end plate into right and left portions.

4. The battery module of claim 2, wherein the pair of elastic members are arranged symmetrically with respect to a center line extending in a transverse direction and dividing the end plate into upper and lower portions.

5. The battery module of claim 1, wherein the at least one elastic member comprises a flat spring.

6. The battery module of claim 1, wherein the at least one fastening member is made of a plastic material.

7. The battery module of claim 1, wherein the at least one fastening member comprises:

a body inserted in the coupling groove; and
a head held close to the outside of the case.

8. The battery module of claim 1, further comprising a cover coupled to an exterior of the case.

9. The battery module of claim 1, further comprising:

another end plate arranged at another outermost rechargeable battery of the plurality of rechargeable batteries located at an end of the battery module opposite the outermost rechargeable battery, the another end plate supporting the plurality of rechargeable batteries; and at least one another elastic member at a surface of the another end plate facing the another outermost rechargeable battery.

10. The battery module of claim 9, wherein each of the at least one elastic member and the at least one another elastic member comprises a pair of elastic members arranged symmetrically with respect to a center line extending in a longitudinal direction and dividing the respective end plate into right and left portions.

* * * * *